United States Patent [19]
Deck

[11] 3,823,400
[45] July 9, 1974

[54] ELECTRONIC TACAN AZIMUTH STABILIZATION

[75] Inventor: Denis L. Deck, Salt Lake City, Utah
[73] Assignee: E-Systems, Dallas, Tex.
[22] Filed: Oct. 12, 1972
[21] Appl. No.: 296,967

[52] U.S. Cl. .......................................... 343/106 R
[51] Int. Cl. .............................................. G01s 1/50
[58] Field of Search ............................... 343/106 R

[56] References Cited
UNITED STATES PATENTS
2,836,815   5/1958   Adams et al. .................. 343/106 R
3,107,352   10/1963  Shapcott ........................ 343/106 R

*Primary Examiner*—Malcolm F. Hubler
*Assistant Examiner*—Richard E. Berger
*Attorney, Agent, or Firm*—Richards, Harris & Medlock

[57] ABSTRACT

Tactical Radio Navigation systems provide distance measuring information to an interrogating aircraft in response to pairs of interrogation pulses received at a beacon transponder, the system also provides bearing and identification information. A single antenna functions to both receive the interrogation pulses and radiate the position determining signals in a radiation pattern having a single fundamental lobe and nine harmonic lobes superimposed thereon with a complete pattern being rotated at a constant speed. In such a system, it is necessary to know when the rotating radiated pattern is pointing 90° clockwise from magnetic north so that a reference pulse may be transmitted to orient the pattern to an interrogating aircraft. Radio navigation systems at fixed sites are oriented on installation to provide accurate indexing information as to the radiated pattern. Systems mounted on a moving platform, however, wherein the antenna does not maintain a fixed orientation, require additional indexing information to properly orient the radiation pattern to an interrogating aircraft. This additional processing of reference pulse information is provided by time incrementing the moving platforms heading reference for a period calculated to orient the radiation pattern with reference to magnetic north. The incrementing time is determined by comparing the incremented heading reference with a signal related to magnetic north.

22 Claims, 12 Drawing Figures

ELECTRONIC TACAN AZIMUTH STABILIZATION

This invention relates to a radio navigation system, and more particularly to electronic azimuth stabilization of a radiation pattern with respect to a reference direction.

Radio navigation systems, such as TACAN, provide bearing information and distance information by a beacon station which radiates pulses according to a rotating multilobed directional pattern. Rotation of the antenna pattern, in effect, amplitude modulates the information pulses to provide an amplitude envelope thereon. Each time the low frequency (e.g., 15 Hz) lobe of this pattern passed a given reference point, a main reference pulse signal is emitted. The phase information of the modulated envelope with respect to the reference pulse signal varies at different azimuth angles from the beacon.

In a receiver of an interrogating craft the information pulses are received from the beacon station and the envelope is separated from the pulses by a filter and the phase of this envelope is compared with the phase of the reference pulse signal to give bearing indication. Distance data is derived by electronically measuring the net time elapsing between transmission of an interrogation pulse pair and receipt of a reply pulse pair from the surface beacon. Subtracting the processing delay, the resulting time interval is directly proportional to the line of site distance between the interrogating aircraft and the beacon.

As explained, in a TACAN navigation system the main antenna pattern rotates at 15 Hz and each time the main lobe sweeps through a given direction, such as for example, 90° clockwise of magnetic north, the spacing between a pair of bursts of RF signal is altered during a brief interval. In addition, as each of the ninth harmonic lobes superimposed on the low frequency pattern sweeps past the magnetic north direction the spacing between pairs of bursts is altered in another manner for a brief interval. The different combinations of pulse pairs transmitted during these brief intervals are referred to as the main reference pulse signal and auxiliary reference pulse signals, respectively. Consequently, upon comparing, at the receiver on board an interrogating aircraft, the phase between the main pulse signal and the fundamental lobe and the phase between the auxiliary pulse signals and the ninth harmonic lobes, signals indicative of course bearing and distance bearing from the interrogating aircraft to the transponder can be derived.

Heretofore, fixed site beacon transponders that are accurately aligned to magnetic north generates the main reference pulse signal and the auxiliary reference pulse signals by an electrical-mechanical generator rotating with the antenna. Previous TACAN systems mounted on a moving platform, such as a ship, have heretofore required an inertially stabilized (in the azimuth plane) trigger generator for the beacon antenna such that azimuth information is independent of ship's heading and the main reference pulse signal and the auxiliary reference pulse signals are thereby maintained aligned to magnetic north. Such inertia stabilization is accomplished by mechanically orienting the electrical-mechanical trigger generator with a servo loop slaved to a compass position. The servo loop compensates for the platform's heading changes and keeps the trigger generator inertially fixed in azimuth.

As compass information is referenced to true north and the TACAN radiating pattern is referenced to magnetic north, a differential synchro transmitter is inserted into the compass signal line to compensate for magnetic variation.

In accordance with the present invention, an azimuth stabilized main reference pulse signal is generated by incrementing a heading reference from a time determined by the antenna index trigger pulse at a rate set by the rotating speed of the antenna and the variation of magnetic north from true north. In effect, the system of the present invention responds to the index trigger pulse generated by a generator of the rotating antenna and produces a main reference pulse signal with compensation for the orientation of a moving platform with reference to magnetic north. A conventional fixed site antenna structure may be utilized with the addition of the present invention for generating the main reference pulse signal to properly orient the rotating pattern with respect to magnetic north.

In accordance with one embodiment of the invention, an electronic reference pulse generator in a navigation system includes an integrator for incrementing with respect to time a heading reference signal. The integration begins at a time determined by the angular difference between a true north reference and the heading reference as evidenced by an index trigger pulse generated at the system rotating antenna. A signal changing with the magnetic north variation from the true north reference is generated for comparison with the incremented heading reference signal in a coincidence detector. When the two signals to the coincidence detector coincide, an output from the detector energizes a trigger generator having an output for transmission as a main reference pulse signal from a rotating antenna.

To better understand the invention, a brief discussion of the general TACAN principles as related to the present radio navigation system will be given. Tactical air navigation (TACAN) is a radio air navigation system of the polar coordinate type which provides an aircraft with distance measuring information (DME) and bearing information. Usually, a meter in an interrogating aircraft indicates, in nautical miles, the distance of the aircraft from a surface beacon. Another meter indicates direction of flight in degrees of bearing with respect to the geographic location of the surface beacon and magnetic north. By knowing the bearing and distance from a specific geographic point, i.e., the ground station beacon transponder, the pilot of an aircraft can fix his position. An identification pulse signal from the surface beacon enables the pilot to identify which beacon he is receiving information from and therefore allows him to plot his geographic location.

The airborne equipment generates timed interrogation pulse-pairs that are received by the surface beacon-transponder system and decoded. After a 50-$\mu$ s delay, the transponder transmits a reply signal. The round-trip time is then converted to distance from the ground facility by the airborne DME equipment. With the ground position known and the distance known, the aircraft location can be positioned on the perimeter of a circle whose radius is equal the measured distance. The timing of the pulses generated is of primary importance for the distance information.

To convey bearing information to an interrogating aircraft, amplitude modulation of the pulses from the ground transponder are employed. Bearing information is produced by a specific directional-radiation pattern rotated around a vertical axis. This signal, when properly referenced to magnetic north, as explained, identifies the aircraft direction from the ground facility. The magnetic north bearing information and the distance-data gives a two point fix for a specific aircraft location.

In a system wherein the present invention is embodied, radio frequency energy is fed to a stationary central antenna array of an antenna system. This central array has no directivity in the horizontal plane. Vertical parasitic elements are rotated around the central array at a fixed number of revolutions per second. The distance between the central array and the parasitic elements is established to obtain a desired cardioid radiation pattern. To an aircraft at a specific location, the distance-data pulses would contain a low frequency amplitude-modulated signal due to the rotation of the cardioid radiation pattern. Bearing information can be obtained by comparing the low frequency modulated signal with a main reference pulse signal received from the ground facility. The phase relationship between the two low frequency signals will be dependent on the location of the receiving aircraft and the cardioid pattern.

A suitable main reference pulse signal transmitted at the same fixed phase of the low frequency will serve as well as a complete wave for the reference signal. These signals are sent out when the maximum of the rotating cardioid pattern aims due magnetic east, provided the antenna is aligned due magnetic north.

For improved accuracy, a group of additional parasitic elements, mounted a fixed number of degrees apart, also rotates around the central antenna array along with the low frequency elements and further modify the cardioid radiation pattern. Although the cardioid pattern is still predominant, it is altered by superimposed ripples. The interrogating aircraft now receives the low frequency with a higher frequency ripple amplitude modulated on the distance data reference and squitter pulses. To furnish a suitable reference for measuring the phase of the high frequency component of the envelope wave, auxiliary reference signal pulses are transmitted from the beacon transponder.

A more complete understanding of the invention and its advantages will be apparent from the specification and claims and from the accompanying drawings illustrative of the invention.

Referring to the drawings.

Figure 1:
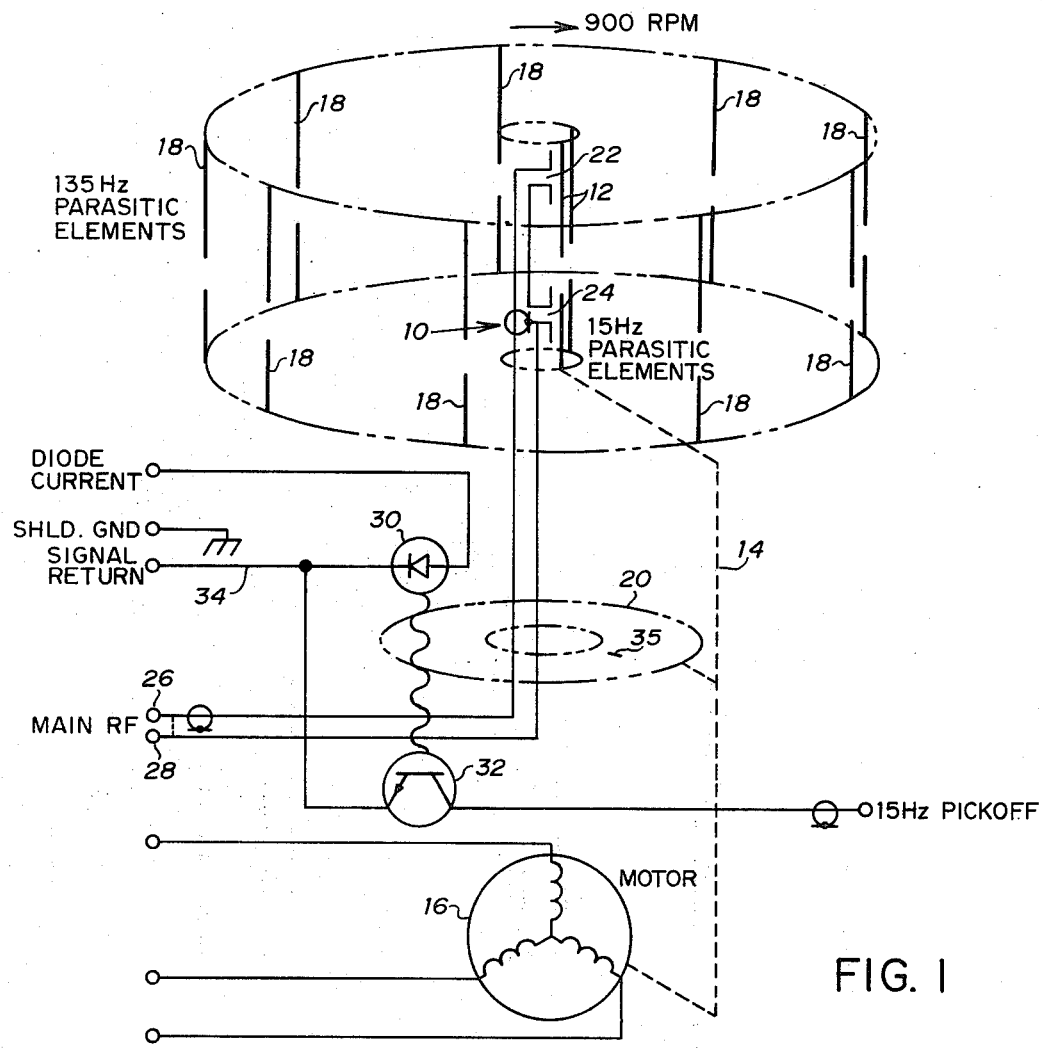
FIG. 1 is a schematic diagram of an antenna system having 15 Hz low frequency and 135 Hz high frequency parasitic elements rotating about a central antenna array and including a reference index generator.

Referring to FIG. 1, there is schematically shown an antenna for use with a TACAN navigation system wherein a central antenna array 10 receives interrogation pulse pairs from interrogating aircraft and also radiates distance, bearing and identification information pulses. The transmitted pulses are modulated at a first frequency by means of parasitic elements 12 mounted to rotate about the central antenna array 10 by means of a mechanical connection 14 to a motor 16. Superimposed on this low frequency modulation is a higher frequency modulation provided by parasitic elements 18.

In the embodiment shown, there are two low frequency parasitic elements 12 and nine high frequency parasitic elements 18. Both of these sets of elements are rotatable about the central array 10 by means of the drive motor 16 mechanically coupled to the supporting structure for the elements such as a nonmetallic drum. Also driven by the motor 16 is a light disc 20 for providing an antenna index trigger pulse.

In the embodiment shown, the central antenna array 10 is the multielement array consisting of half-wavelength dipoles 22 and 24 stacked on top of one another. A pulsed radio frequency is fed to the terminals 26 and 28 of an RF input connector and is routed to the stacked array of dipoles 22 and 24.

The technique used for generating the antenna index trigger pulse uses an infrared detecting device operated in conjunction with the light disc 20 thereby creating pulses which are synchronized with the rotation of the parasitic elements 12 and 18. The antenna index trigger pulse is generated by employing a light emitting diode 30 above the light interrupting disc 20. Light passing from the emitting diode through the rotating disc 20 impinges on a photosensitive transistor 32 as part of a trigger amplifier. In the configuration shown, the transistor 32 has an emitter electrode connected to ground through a line 34 connected to a trigger amplifier. The collector electrode of the transistor 32 is also connected to a trigger amplifier with this amplifier serving to increase the signal level for transmission to the control system of the present invention.

Radio frequency energy emitting from the central antenna array 10 has no directivity in the horizontal plane. To convey bearing information to a using aircraft, pulses from the central array are amplitude modulated by rotating the parasitic elements 12 around the dipoles 22 and 24 at a fixed number of revolutions per second. The distance between the dipoles 22 and 24 and the parasitic elements 12 along with the speed of rotation of the motor 16 establishes the modulation frequency applied to the pulses from the central antenna array. The parasitic elements 12 thus impose an amplitude modulation component on the broadcast pulse train from the central antenna array.

Figure 2:
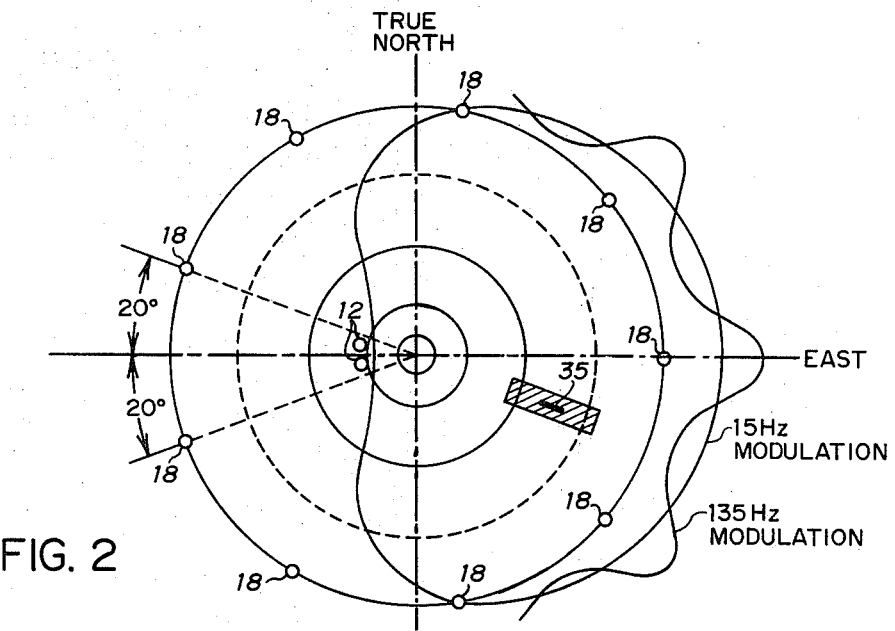
FIG. 2 is a top view of a physical phasing diagram of an antenna pattern of the type radiated by the antenna of FIG. 1.

The basic cardioid pattern of energy from the antenna is illustrated in FIG. 2 which shows a top view of the radiation pattern. To an aircraft at a specific location, all pulses now contain an amplitude modulated signal due to the rotation of the cardioid radiation pattern. Bearing information is obtained by comparing the modulated signal with a magnetic north reference signal periodically transmitted from the central antenna array 10. The phase relationship between the modulated signal and the reference signal at the aircraft will be dependent on the location of the using aircraft within the cardioid pattern.

To improve the accuracy of the bearing information transmitted from the central antenna array 10, the group of nine parasitic elements 18 are mounted to rotate with the parasitic elements 12 aout the dipoles 22 and 24. These nine parasitic elements rotating around the dipoles 22 and 24 with the parasitic elements 12 modify the cardioid radiation pattern as also shown in FIG. 2. Although the basic cardioid pattern is still dominant it is altered by superimposed ripples. Using nine parasitic elements, the maxima of these ripples, or minor lobes, are spaced 40° apart. To furnish a suitable reference for measuring the phase of the high frequency component of the envelope wave a series of auxiliary reference pulse signals, similar to the main reference pulse signal, is sequentially transmitted from the central antenna array 10.

The rotating light interrupting disc 20 is a metal disc with a transparent slot. This disc is schematically illustrated in FIG. 2 superimposed with the cardioid radiating pattern from the central antenna array. The single slot 35 rotates to interrupt light from the diode 30 to the photosensitive transistor 32 to provide a single index trigger pulse for establishing the orientation of the antenna with reference to its mounting and subsequently timing the transmission of the main reference pulse and the auxiliary reference pulse signals. A bracket holding the light emitting diode 30 and the photosensitive transistor 32 is adjustable to obtain proper reference alignment between the rotating parasitic elements 12 and 18 and the reference index pulse.

In ground based TACAN systems where the antenna is oriented such that the index trigger pulse from the transistor 32 always appears with the slot 35 aligned with magnetic north, this pulse is then transmitted as the main reference pulse signal for a using aircraft to orient with the low frequency and high frequency cardioid patterns of FIG. 2. When the navigation system including the antenna of FIG. 1 is mounted on a moving platform the slot 35 will not necessarily be aligned with magnetic north and the main reference pulse signal occurs at some indeterminate position and the receiving aircraft cannot properly establish a bearing for the lack of a reference point for the received cardioid wave. To establish a main reference pulse signal that is transmitted by the central antenna array 10 to be aligned with magnetic north, the system of the present invention takes the known position of the rotating antenna as established by the index trigger pulse from the transistor 32 for each revolution and computes in real time when the slot 35 reaches magnetic north (the main cardioid radiation pattern is 90° clockwise from the index point) at which time a main reference pulse signal is caused to be transmitted from the central antenna array 10. The computation is initiated when the index point (slot 35) is aligned with a selective heading reference and this is the known position from which all computation starts.

Figure 3:
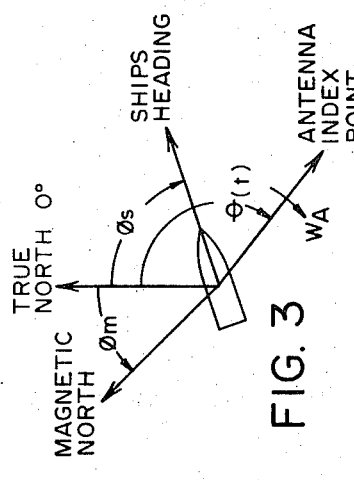
FIG. 3 is a schematic illustrating the required compensation when utilizing the antenna of FIG. 1 on a moving platform.

Referring to FIG. 3, there is shown a plot of the various angles for completing the computation to generate a main reference pulse signal when the index slot 35 is aligned with magnetic north. Assuming that the moving platform is a ship and the heading reference is the ship's heading and is aligned with the keel, the computation of when the main reference pulse signal is to be transmitted requires an input data the angle between a true north reference and the heading reference plus a time differential in accordance with the expression:

$$\theta(t) = \omega_a \int_{t_0}^{t} dt + \phi_s \quad (1)$$

where $\phi_s$ = the ship's heading reference in degrees measured clockwise from a true north reference, $\Omega_a$ = the magnitude of the angular velocity in degrees per second of the rotating parasitic elements 12 and 18, and $\theta(t)$ = the position of the antenna index slot 35 in degrees as a function of time measured clockwise from a true north reference.

Commencing the integration of equation (1) at $t_o$, that is, when $\theta(t) = \phi_s$, the integration may be converted into the following summation:

$$\theta(t) = \Omega_a \Sigma \Delta t + \phi_s \quad (2)$$

where $\Delta t$ is an incremental increase in the angular movement of the reference slot 35 with respect to time from the reference heading. This summation commences when the photosensitive transistor 32 generates an index trigger pulse and continues until the slot 35 is aligned with magnetic north. The slot 35 will be in alignment with magnetic north when $\theta(t) = 360° - \phi_m$, where $\phi_m$ = the magnetic variation in degrees measured counterclockwise from the true north position. Thus, the summation of equation (2) continues until the following expression is satisfied:

$$360 - \phi_m = \Omega_a \Sigma \Delta t + \phi_s \quad (3)$$

Figure 4:
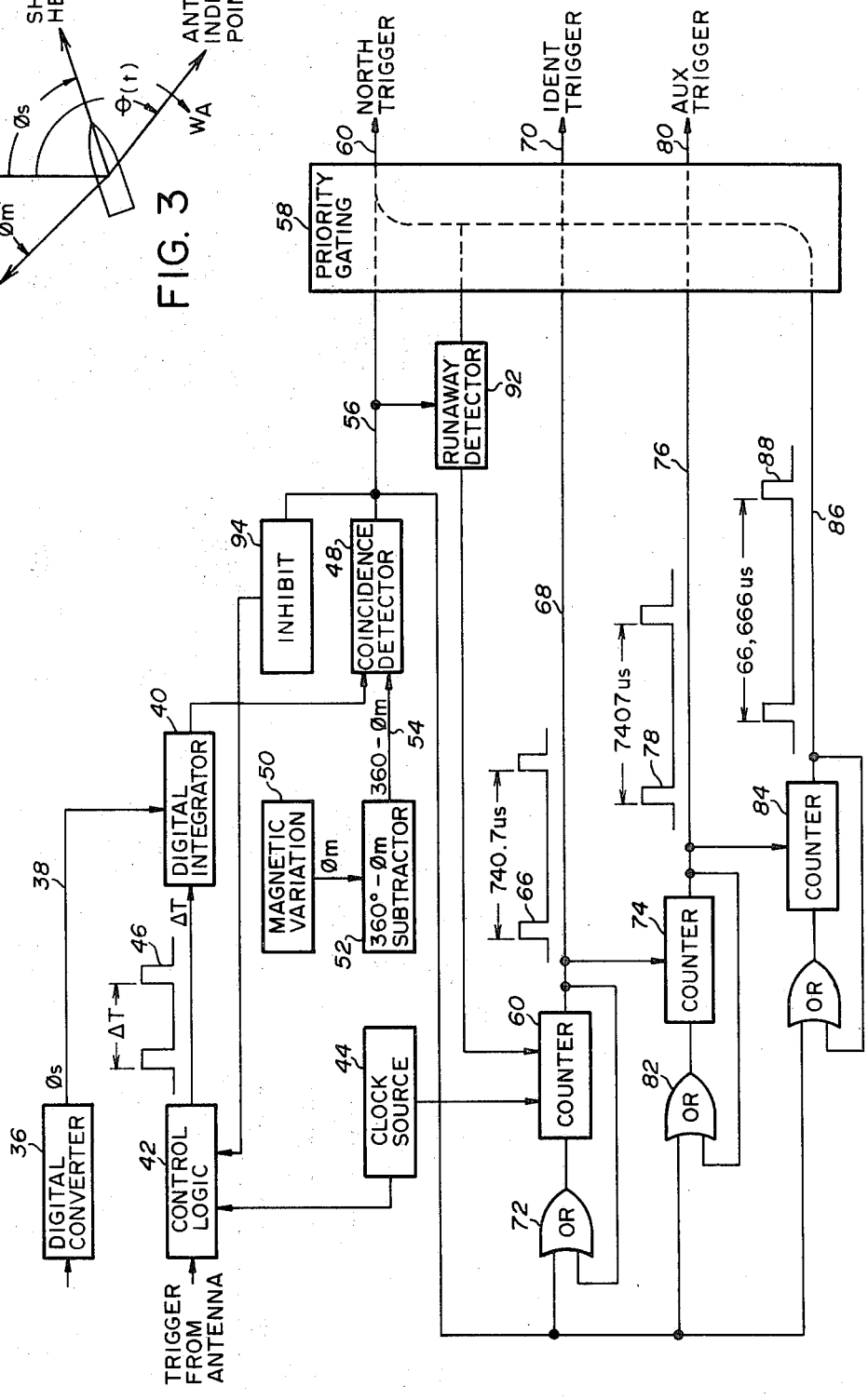
FIG. 4 is a block diagram of a system for compensating an index trigger pulse generated at a rotating antenna for variation of a supporting platform heading with respect to magnetic north.

Referring to FIG. 4, there is shown a block diagram for implementing the summation of equation (2) until the expression (3) is satisfied. A heading reference, as established by a ship's compass, for example, at the output of either a single or multispeed synchro (conventional shipboard equipment) is applied to the input of a synchro-to-digital converter 36 for converting the heading reference signal into a digital representation on line 38 as the initial condition input to a digital integrator 40. With reference to equation (2), this is the $\phi_s$ term.

Also as an input to the system of FIG. 4, the index trigger pulse as generated by the photosensitive transistor 32 is applied as an input trigger to start/stop control logic 42. The control logic 42 receives clock pulses from a source 44 with the clock pulse spacing equal to the $\Delta t$ term of equation (2). The pulse spacing, as shown by the curve 46, is established to represent a fixed angular increment of rotation of the parasitic elements 12 and 18. For example, the pulse spacing is 18.5 microseconds which for one laboratory model of the present invention represented a one-tenth degree rotation of the parasitic elements 12 and 18.

These precision clock pulses from the control logic 42 are applied to a second input of the digital integrator 40 and represent the second factor of the summation term of equation (2).

The digital integrator 40 functions to add to the digital representation of the heading reference, as given on line 38, angular increments of measurement starting when the reference slot 35 is aligned with the reference heading of the platform supporting the antenna. An output of the digital integrator 40 is given by equation (2) and is a digital representation thereof and applied to one input of a coincidence detector 48.

As a second input to the coincidence detector 48, the magnetic variation from true north at a particular longitude and latitude is set in the magnetic variation network 50. This setting is in the form of a digital signal and is applied to a subtracter 52. The subtracter 52 mathematically computes the difference between the true north reference and the magnetic variation. This is the expression of equation (3) and is given by a digital representation on line 54 as a second input to the coincidence detector 48.

In operation of the coincidence detector 48, the input on line 54 is the difference between the true north reference of FIG. 3 and the magnetic variation, that is, the signal on line 54 is the position of magnetic north at the particular longitude and latitude set into the network 50. Starting at a time when the reference slot 35 aligns with the reference heading, angular increments are added to the reference heading on line 38 in the digital integrator 40. This continually increasing summation is the second input to the coincidence detector 48. Additional angular increments are added to the reference heading until coincidence occurs between the two inputs to the detector 48. At this time, the reference slot 35 is aligned with magnetic north and an output is generated on the line 56 to priority gating logic 58. The priority gating logic 58 responds to the output pulse of the coincidence detector 48 and generates a pulse (north burst trigger) on line 60 to a transmitter having as an output the main reference pulse signal for transmission from the central antenna array 10.

Assuming that the slot 35 is in the second quadrant of the pattern of FIG. 2, the transistor 32 generates an index trigger pulse at this time as the slot is then in alignment with the platform's reference heading. However, the reference heading of the platform is not magnetic north and if the index trigger pulse actuates the transmitter of the main reference pulse signal, a using aircraft cannot establish a bearing direction for lack of information of the platform's heading.

To properly orient the cardioid pattern as received by an interrogating aircraft, the index trigger pulse of the transistor 32 is delayed for a period of time sufficient to allow the slot 35 to be rotated until in alignment with magnetic north as given by the axis 62 of FIG. 2. This delay is implemented by the system of FIG. 4 wherein by summing angular increments to the reference heading and comparing this summation with a magnetic north signal, a delay corresponding to the time required for the slot 35 to rotate in alignment with the axis 62 is implemented prior to generating an output pulse on the line 56 and in turn a north burst trigger on the line 60.

At the time an output signal is generated by the coincidence detector 48 on line 56 a pulse is applied to a network 94 for generating an inhibit signal to the control logic 42. At this time, the digital integrator is inhibited and at some time later loaded with the initial condition, that is, an updated heading reference on line 38.

Thus, after inhibiting the integrator 40, it remains in an at rest condition until a subsequent trigger from the transistor 32 causes a reloading of the integrator with an updated heading reference and starts the control logic 42 to transmit clock pulses from the source 44 to the integrator 40. The cycle is then repeated adding angular increments to the reference heading on line 38 until a coincidence occurs with the output of the subtracter 52 in the coincidence detector 48.

As mentioned previously, in addition to the main reference pulse signal, the central antenna array 10 also emits an identifying pulse sequence to enable a using aircraft to identify a particular transponder station. These identifying pulses are synchronized with the transmission of the main reference pulse signal. With reference to FIG. 4, the identifying pulse signals are generated at the output of a counter 64 having an input connected to the clock source 44. As given by the curve 66, the counter 64 generates identifying pulse signals once each 740.7 microseconds on a line 68. The line 68 connects to the priority gating logic 58 wherein the identifying pulses are generated on a priority basis with the main reference pulse signal taking priority over the identifying pulse signal as generated on line 70.

To synchronize the identifying pulse signals with the main reference pulse signal, an output from the detector 48 couples to one input of an OR gate 72 having an output applied to the reset terminal of the counter 64. Thus, each time an output pulse is generated on the line 56 the OR gate 72 resets the counter 64 and a new sequence of identifying pulse signals are generated on the line 68. The counter 64 is also reset at each occurrence of an output pulse on the line 68 to provide the required time spacing between subsequent pulse signals.

Also synchronized with the main reference pulse signal are the auxiliary reference pulse signals to be transmitted from the central antenna array 10 for orientation by a receiving aircraft of the high frequency cardioid pattern of the antenna. The auxiliary reference pulse signals are generated by a counter 74 having a sequencing input connected to the output of the counter 64. Thus, the counter 74 is incremented once for each occurrence of an output pulse from the identifying pulse counter 64. Upon the occurrence of the tenth output pulse from the counter 64, an output pulse appears at the counter 74 on a line 76 connected to the priority gating logic 58. As given by the curve 78, output pulses from the counter 74 occur once every 7407 microseconds.

The priority gating logic 58 generates the auxiliary reference pulse signals on a line 80 as connected to the central antenna array 10 for transmission therefrom. Again, the main reference pulse signal takes priority over the auxiliary reference pulse signals and the priority gating logic 58 blocks the output of the counter 74 whenever a main reference pulse signal is generated on the line 60. In order of priorities, the main reference pulse signal has first priority for transmission, the auxiliary reference pulse signals take second priority and the identifying pulse signals have the lowest priority and are blocked if any of the preceding signals are to be transmitted.

It is also necessary to synchronize the output of the counter 74 with the generation of the main reference pulse signal. This is accomplished by connecting the output of the coincidence detector 48 to an OR gate 82 having an output connected to the reset terminal of the counter 74. Thus, upon each occurrence of a main reference pulse signal the counter 74 is reset. The counter 74 is also reset by a connection from the output of the counter to the OR gate 82 to establish the spacing between subsequent pulses on the line 76.

As will be apparent from the preceding description, for an interrogating aircraft to make use of signals transmitted from the central antenna array 10, a main reference pulse signal must be transmitted to properly orient magnetic north to the using aircraft. Should this main reference pulse signal be omitted from the energy transmitted from the central antenna array 10, ambiguous bearing information will be received by the using aircraft. To insure a transmission of the main reference pulse signal the system of FIG. 4 includes a counter 84 having a clock input connected to the output of the counter 74. The counter 84 identified as the "missing pulse detector" generates a sequence of pulse signals on line 86 spaced apart 66,666 microseconds as given by curve 88.

The time span between subsequent pulses on the line 86 is set to coincide with the speed of rotation of the parasitic elements 12 and 18. For the usual TACAN system, one revolution of the parasitic element takes place once each every 66,666 microseconds. If at the end of the time span between pulses on the line 86 the counter 84 has not been reset, the priority gating logic 58 transmits the output of the counter 84 on line 60 as the main reference pulse signal, again taking priority over the identifying pulse signals and the auxiliary reference pulse signals. The counter 84 is reset whenever an output pulse is generated by the coincidence detector 48 as applied to one input of an OR gate 90 having an output connected to the counter reset terminal. Thus, each time an output occurs at the detector 48 the counter 84 resets to start a new time period for generating a pulse on the line 86.

Upon a malfunction in the system where an output is not generated at the coincidence detector 48, the counter 84 continuously generates main reference signals on the line 60. Considering that the platform supporting the antenna may be continuously changing heading, these substitute main reference pulse signals will be erroneous. To prevent erroneous main reference pulse signals from being generated by the counter 84, a runaway pulse detector 92 is connected to the priority gating logic 58 and the output of the detector 48. If two subsequent substitute main reference pulse signals are generated by the counter 84, the runaway pulse detector 82 increments to shut down the entire navigation system. Thus, any errors introduced by generating the main reference pulse signals from the counter 84 are minimized.

At any time the detector 48 generates an output pulse, the runaway detector 92 will be reset and the system returns to normal operation, as described.

Figure 5A:
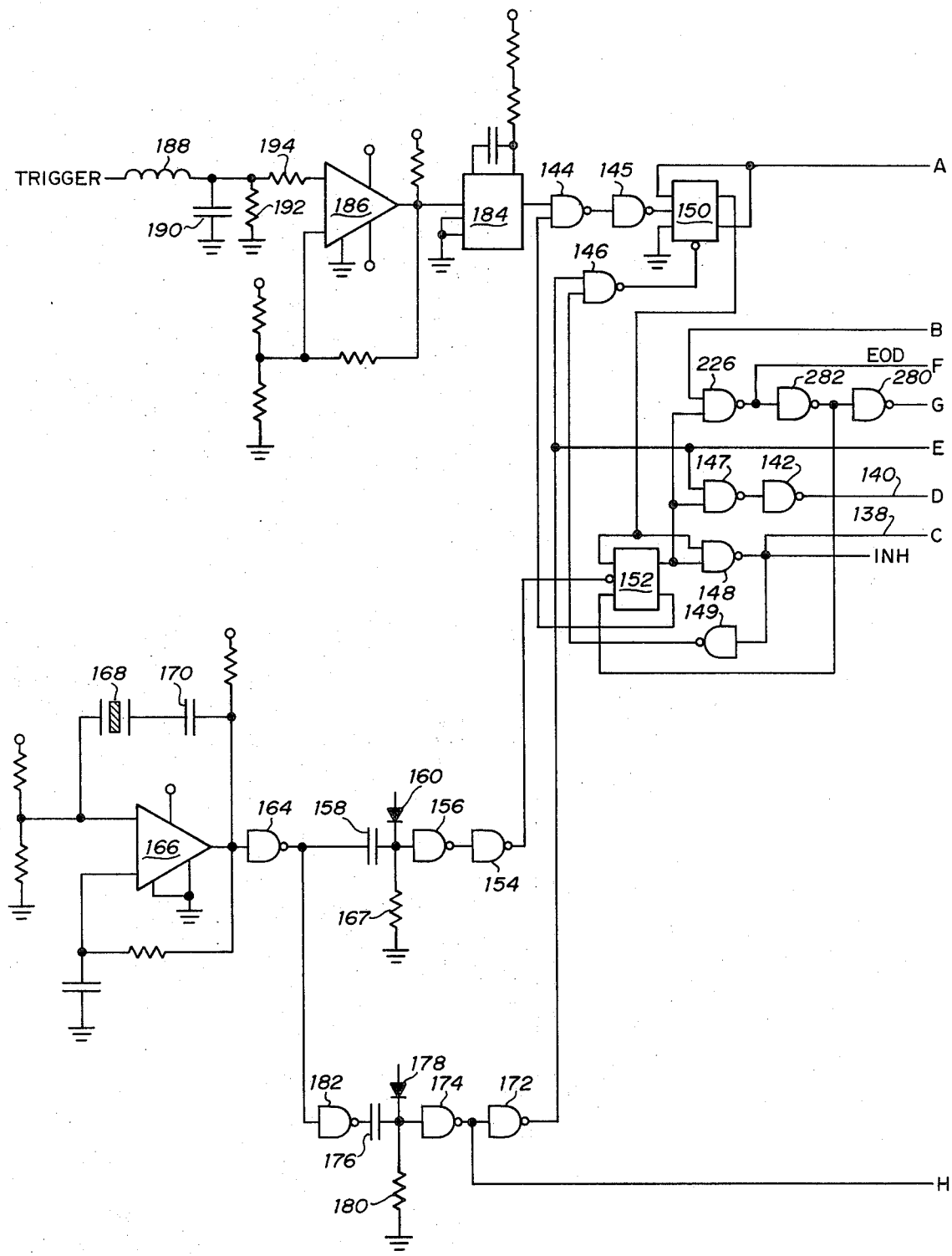
FIGS. 5A, 5B and 5C are a logic diagram of a digital implementation of one embodiment of a system for generating a compensated main reference pulse signal.
Figure 5B:
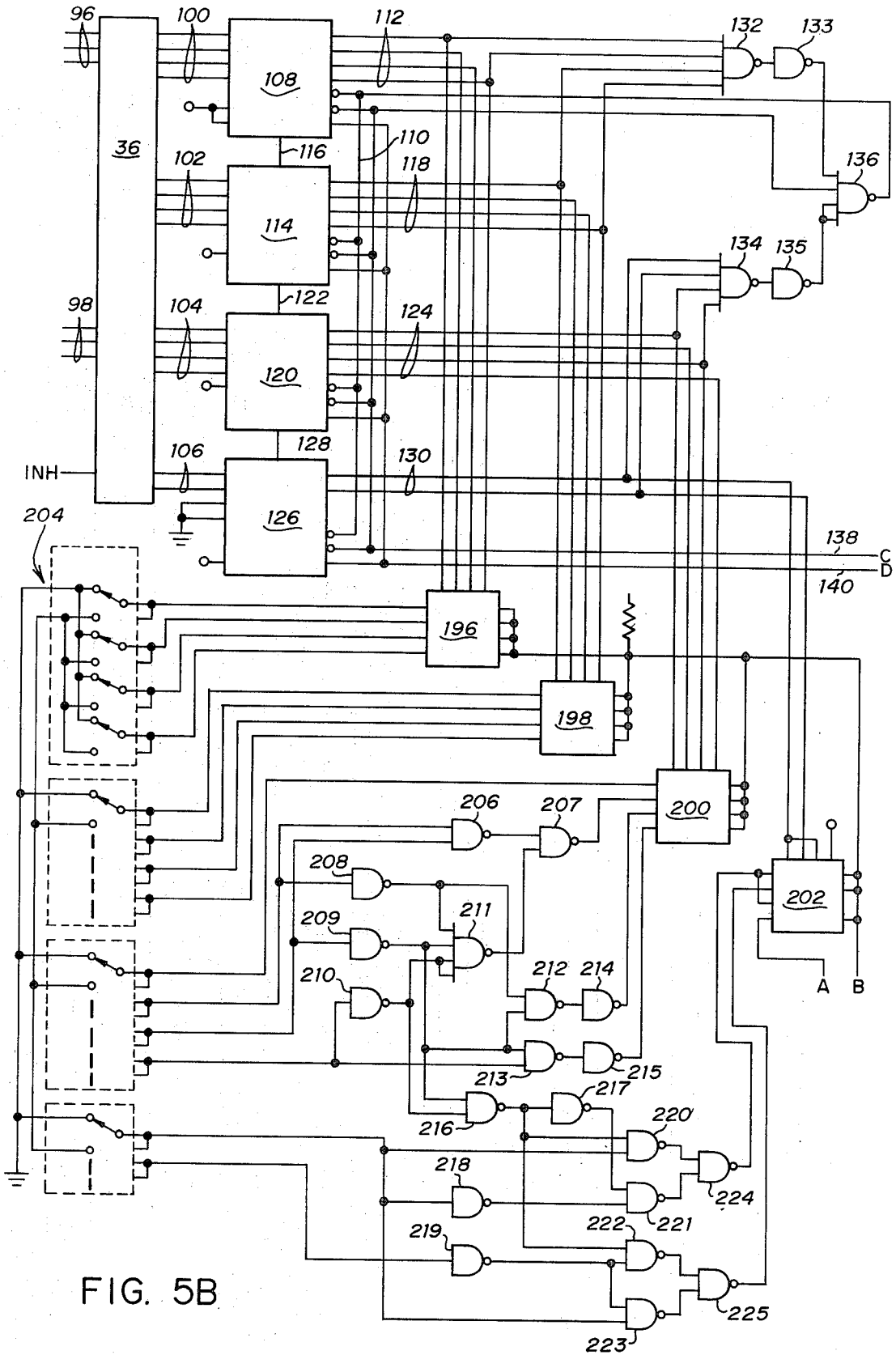
Figure 5C:
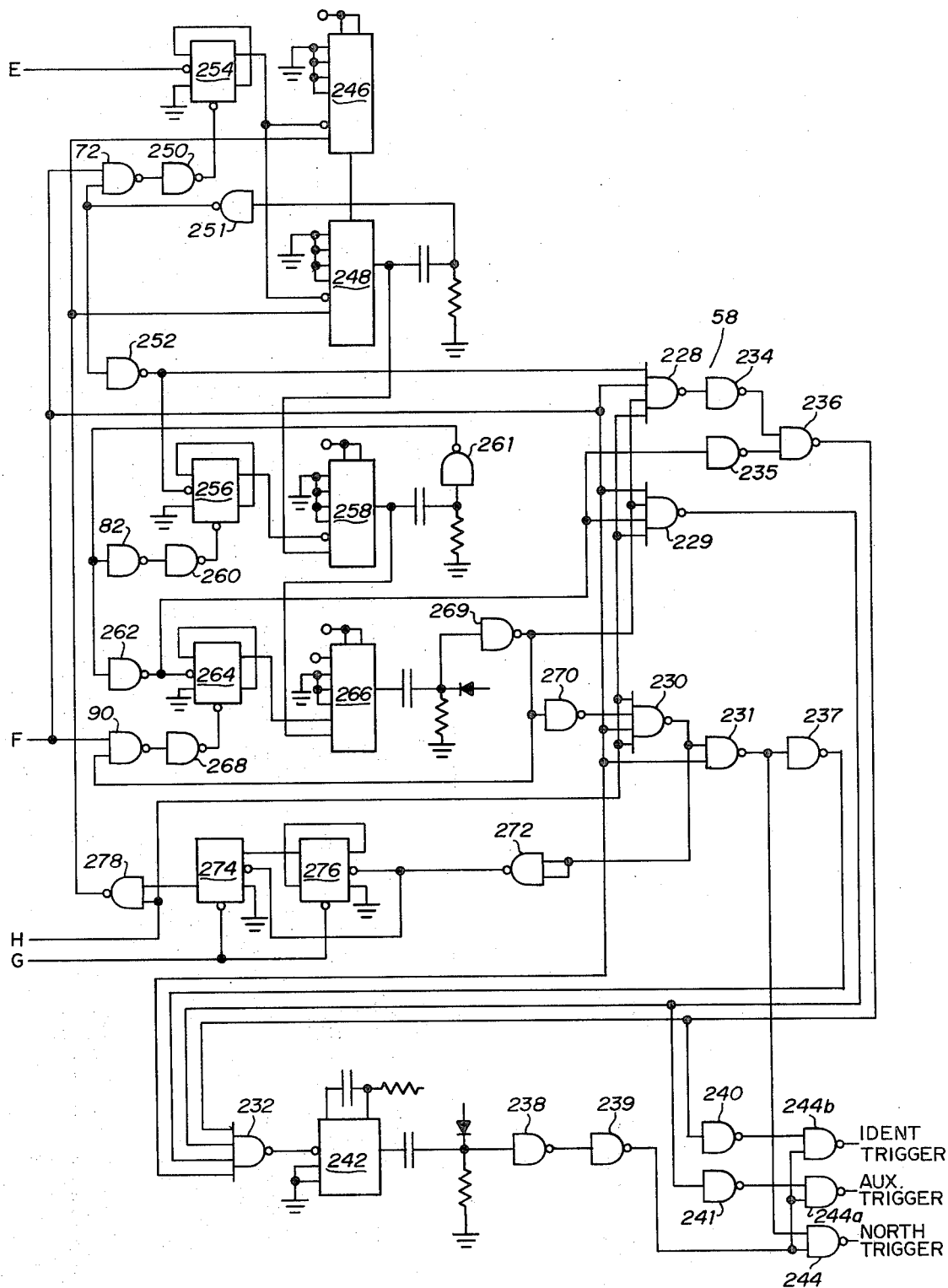

Referring to FIG. 5, there is shown a logic diagram of one operative embodiment of the system that functions in the binary coded decimal format. Reference heading signals from the platform's compass synchro are applied to the converter 36 on either lines 96 or lines 96 and 98. The digital converter 36 generates four sets of binary coded decimal logic levels on lines of groups 100, 102, 104 and 106. Lines of group 100 represent tenths of degrees of angular reference heading data, lines of the group 102 represent units of degrees of the angular reference data, lines of the group 104 represent the second most significant digit and lines of the group 106 represent the most significant digits.

Logic levels on the lines of the group 100 are applied to a decimal digital counter 108 receiving clock pulses on line 110 and generating an incremented output on lines 112. Digital angular reference data on the lines of group 102 is applied to a counter 114 interconnected to the counter 108 by a carry line 116 and receiving clock pulses on the line 110. As incremented output from the counter 114 is generated on lines of a group 118. The lines of the group 104 are interconnected to inputs of a counter 120 interconnected to the counter 114 through a carry line 122. The second most significant digit counter 120 interconnects to the clock pulse line 110 and generates an incremented output on the lines of group 124. Binary bits of the most significant digit on the lines of group 106 are applied to inputs of a counter 126 interconnected to the counter 120 by a carry line 128. The counter 126 connects to the clock pulse line 110 and has outputs on lines of a group 130.

Two outputs of each of the counters 108, 114, 120 and 126 interconnect to clear logic comprising gates 132–136 with the output of the gate 136 connected to the clear terminal of each of the counters to clear the counters of a previously generated heading signal at a count of 359.9°. That is, when the index mark 35 has rotated to a true north position. The counters 108, 114, 120 and 126 are loaded in response to a pulse on line 138, as will be explained.

In total, the counters 108, 114, 120 and 126 comprise the digital integrator 40 and are incremented in response to clock pulses on a line 140. Clock pulses on the line 140 are generated at the output of a NAND gate 142 as part of the control logic 42 that also includes gates 144–149 and flip-flops 150 and 152.

Clock pulses to the control logic 42 are generated at the output of a gate 154 in series with a gate 156, the latter connected to a differentiator circuit including a capacitor 158, a diode 160 and a resistor 162. The capacitor 158 is connected to the output of a gate 164 having an input from a crystal oscillator including an operational amplifier 166 with a crystal 168 in series with a capacitor 170 in a feedback circuit. A second clock pulse (delayed 180° from the first clock pulse) from the source 44 is generated at the output of a gate 172 in series with a gate 174, the latter having an input connected to a differentiator circuit including a capacitor 176, a diode 178 and a resistor 180. The differentiator circuit is connected to the output of a gate 182 having an input tied to the gate 164.

The index trigger pulse applied to the control logic 42 is generated at the output of a single shot miltivibrator 184 driven by an amplifier 186. An input to the amplifier 186 is the pulse signal generated by the transistor 32 applied through an input network that includes an inductance coil 188, a capacitor 190 and resistors 192, 194. With the amplifier 186 driving the single shot 184, the trigger pulse from the control logic 42 will be delayed a selected angular increment in the particular embodiment of FIG. 5 and the output of the single shot 184 will be a compensated index trigger.

As explained, clock pulses from the source 44, as appearing at the output of the gate 154, are clocked through the control logic 42 in response to an index trigger pulse signal. This index trigger pulse signal is generated at the output of the flip-flop 184 to set the flip-flops 150 and 152 to pass the output of the crystal oscillator 166 to the clock pulse terminals of the counters 108, 114, 120 and 126. Each clock pulse applied to these counters advances the count one increment to integrate the reference heading signal from the converter 36 by an amount equal to 0.1°.

The incremented reference heading at the output of each of the counters 108, 114, 120 and 126 is applied to the coincidence detector 48 comprising bit comparators 196, 198, 200 and 202. Comparator 196 connects to the counter 108, comparator 198 connects to the counter 14, comparator 200 connects to the counter 120 and comparator 202 connects to the counter 126. A magnetic north signal as generated on line 54 is applied to additional inputs of each of the comparators 196, 198, 200 and 202.

The magnetic variation for the particular longitude and latitude is set by a series of nine's complement switches 204. The first four switches of the group 204 are the least significant bits and are connected to the least significant comparator 196. The next four switches are of one greater degree of significance and are applied directly to the comparator 198.

In the implementation illustrated in FIG. 5, the magnetic variation is set in nine's complement switches and the subtraction as carried out in the subtracter 52 is a subtraction from 359.9°. As will be understood, using this form of logic, the two least significant bits representing the magnetic variation are applied directly to the comparators without passing through subtracter logic. For the second most significant bits as set on the third group of switches 204, subtracter logic including gates 206–215 is connected between the switches and the input of the comparator 200. Likewise, the digital representation of magnetic variation for the most significant bits is connected to subtracter logic comprising gates 216–225 and then to the inputs of the comparator 202.

The system of the present embodiment functions on the 359.9° limit by the particular arrangement of logic in the control logic 42. An output from the single shot 184 sets the flip-flops 150 and 152, however, the integrator 40 does not begin to increment the heading reference signal at this time. At the next clock pulse from the gate 154 the output of the gate 148 sends an inhibit signal to the converter 36 there y blocking further input data to the counters 108, 114, 120 and 126. Upon the occurrence of the next clock pulse from the gate 172 the inhibit signal is removed from the converter 36 and heading reference data is loaded into the integrator counters. The count, however, does not begin at this time. At the next clock pulse from the gate 172 the first incrementing pulse is generated at the output of the gate 142 and subsequent clock pulses from the gate 172 produce the incrementing pulses from the gate 142 to the counters 108, 114, 120 and 126. Thus, there is a one increment delay between the compensated index trigger at the single shot 184 and the first incrementing pulse to the counters. This enables the system to function for a 359.9° limit as a full revolution of the antenna.

When coincidence occurs in each of the comparators 196, 198, 200 and 202 between the inputs applied thereto, an output pulse is generated through a gate 226. The output of this gate is the end of delay (EOD) signal connected to the priority gating logic 58.

The end of delay signal at the output of the gate 226 is applied to inputs of gates 228–232 as part of the priority gating logic 58. Also included as part of the gating logic 58 are gates 234–241 and including a single shot multivibrator 242. Whenever the EOD signal is generated at the output of the gate 226 the identifying pulse signal, the auxiliary reference pulse signals, and the missing pulse signal are inhibited and a gate 244 generates a north trigger to enable a transmitter for generating the main reference pulse signal to be transmitted from the central antenna array 10.

In addition to the gates 228–232, the EOD signal from the gate 226 is also applied to OR gates 72, 82 and 90 for resetting the counters 64, 74 and 84, respectively. In the system of FIG. 5, the identifying pulse counter 64 comprises binary coded decimal counters 246 and 248, gates 250–252 and a flip-flop 254. The flip-flop 254 receives the clock pulses from the gate 172 to step the counters 246 and 248.

Output pulses from the gate 252 are illustrated by the waveform 66 and are applied to the gate 228 of the priority gating logic 58. In addition, an output pulse at the gate 252 is applied to an input of a flip-flop 256 as part of the auxiliary reference pulse counter 74. Also included as part of the counter 74 is a binary coded decimal counter 258 and gates 260–262. The output of the gate 262 comprises a trigger for enabling a transmitter to generate the auxiliary reference pulse signals as illustrated by the waveform 78. This series of trigger pulses is applied to gates 229 and 235 of the priority gating logic 58.

Also connected to the output of the gate 262 is a flip-flop 264 as part of the missing pulse counter 84. The counter 84 comprises a binary coded decimal counter 266 and gates 268–270. An output of the gate 270 comprises a trigger pulse to enable a transmitter to generate the missing pulse signals as a substitute for the main reference pulse signal. This output is connected to the gate 230 of the priority gating logic 58. Also connected to the gating logic 58 is the output of the gate 269 as applied to the gates 228 and 229. This output establishes the priority of the missing pulse signal over both the identifying pulse signal and the auxiliary reference pulse signals.

In the system of FIG. 5, the priority selection between the main reference pulse signal, the auxiliary reference pulse signals and the identifying pulse signals is controlled by the pulse width from the gates 226, 252, 262 and 270, with the latter representing the substitute main reference pulse signal. A pulse from the gate 226 may typically be 1 microsecond in duration, from the gate 270 typically 0.6 microseconds, from the gate 262 typically 0.4 microseconds and from the gate 252 the pulse width may be typically 0.2 microseconds. The selection being made on the length of the last pulse to be present.

To limit the number of substitute main reference pulse signals transitted from the central antenna array 10, the output of the gate 230 is applied to a gate 272 of the runaway detector 92. Also included as part of the detector 92 are flip-flops 274 and 276 and a gate 278. To reset the detector 92 when the system returns to normal operation, the flip-flops 274 and 276 are connected to the output of a gate 280 having an input from the gate 282 which receives the end of delay signal from the gate 226. The output of the gate 282 also connects to the flip-flop 152 to reset the control logic 42 and thereby inhibit the gate 147 from incrementing the counters 108, 114, 120 and 126.

One additional operation of the gating logic 58, outputs from the main reference pulse signal, the substitute main reference pulse signal, the auxiliary reference pulse signals and the identifying pulse signals are all connected to the gate 232. An output of the gate 232 trigger the single shot multivibrator 242 that generates an inhibit pulse to the output gates 244, 244a and 244b. This inhibit pulse of fixed width, e.g. 0.1 microseconds, prevents generating an output from the priority logic 58 in response to a noise signal.

Figure 6A:
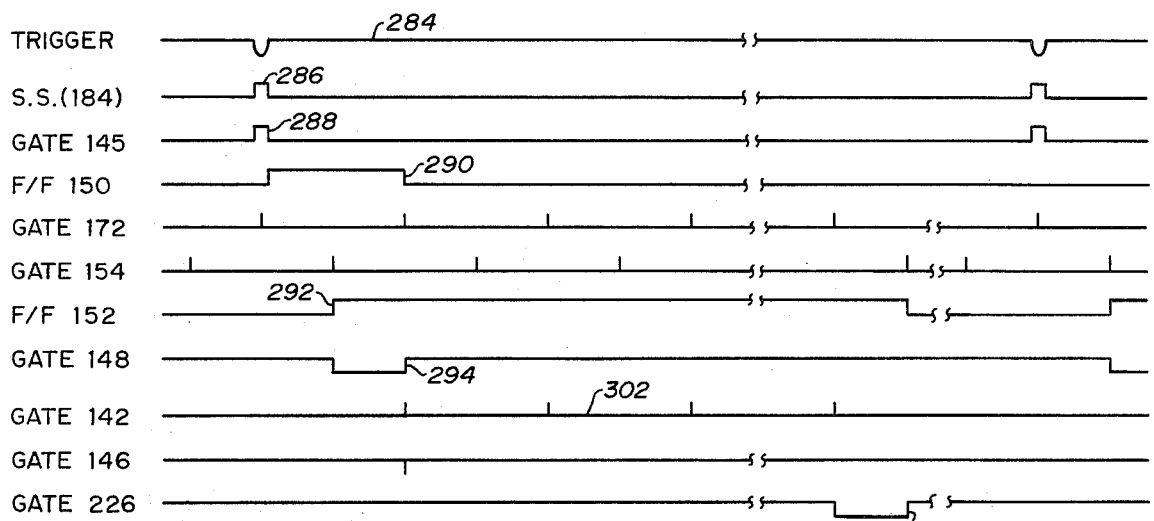
FIGS. 6A, 6B, 6C and 6D are timing diagrams related to the operation of the system of FIG. 5.
Figure 6B:
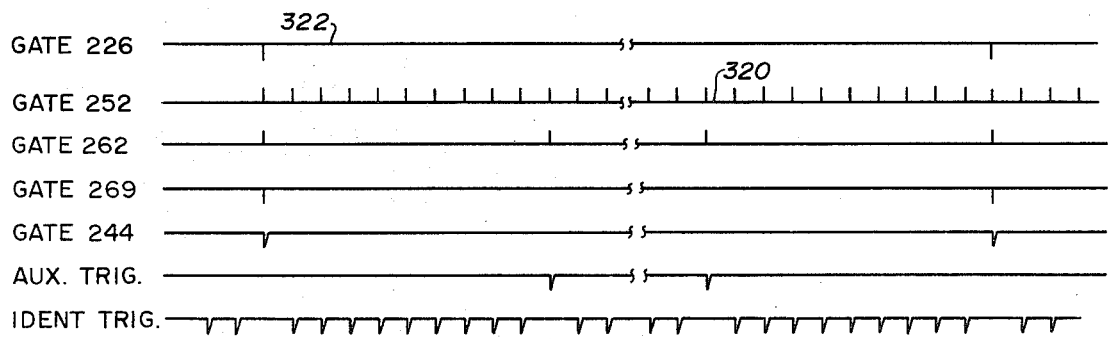
Figure 6C:
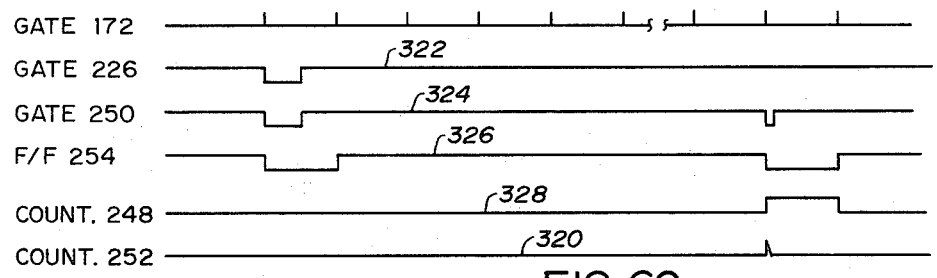
Figure 6D:
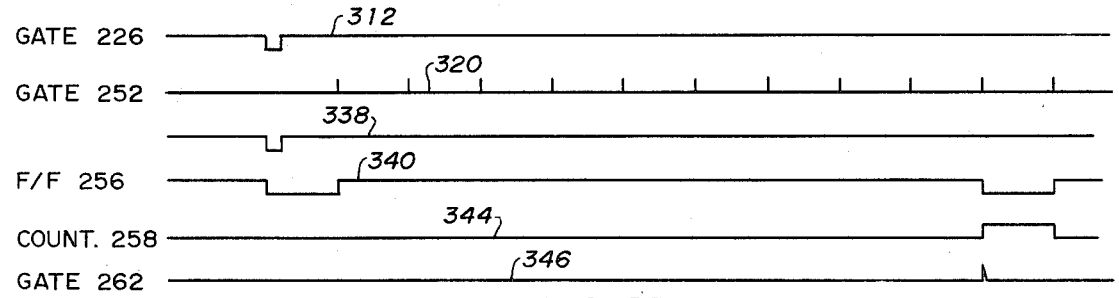
Figure 7:
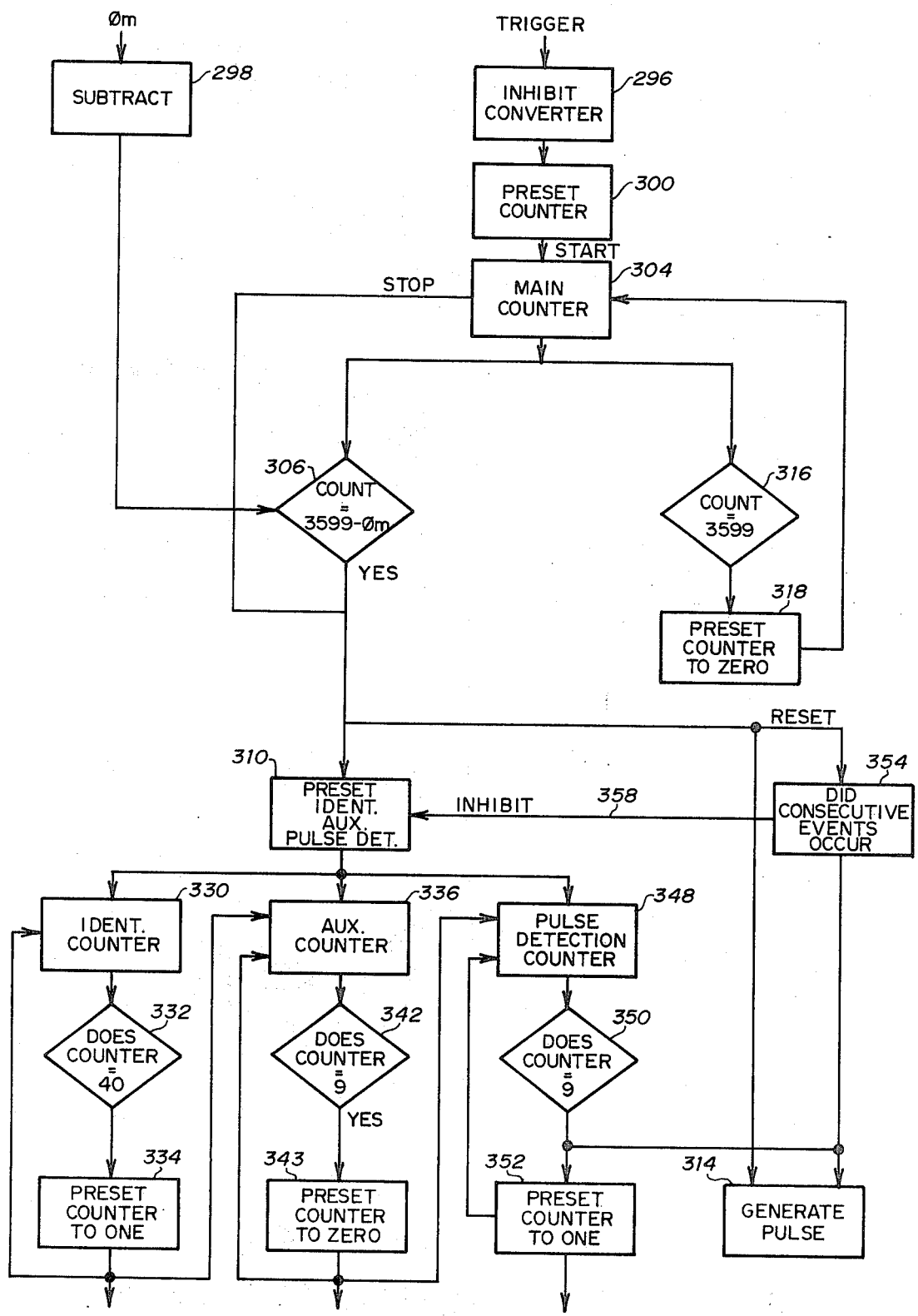
FIG. 7 is a flow chart showing the compensation of an index trigger pulse by a system as detailed in FIG. 5.

In operation of the embodiment of FIG. 5, reference is made to the timing diagram for FIG. 6 and the flow chart of FIG. 7. An antenna index trigger pulse is applied to the coil 188 as shown by the curve 284 of FIG. 6A and the single shot multivibrator 184 generates a compensated single pulse as at 286 and sets the gate 145 as at the pulse 288 to set the flip-flops 150 and 152, as explained. An output of th flip-flop 150 is shown at 290.

The timing sequence for the above operation is controlled by clock pulses from the gate 154 and a second train of clock pulses from the gate 172. Upon the occurrence of the first clock pulse from the gate 154, after setting the flip-flops 150 and 152, the flip-flop 152 is reset such that the output to the gate 148 goes low as illustrated by the curve 294. When the output of the gate 148 steps low, as given by the curve 294, an inhibit signal is generated to the digital converter 36 to maintain the last heading reference data and a command is also given to load the counters 108, 114, 120 and 126; the command, however, is not executed at this time. This maintain step is given by block 296 of FIG. 7 in response to the output of the gate 148. Upon the occurrence of the next clock pulse from the gate 172, the flip-flop 150 steps low and the inhibit pulse is removed from the output of the gate 148. At this time, the converter 36 again receives updated reference heading information.

Parallel with the operation of loading the converter 36, the magnetic variation is set and this angular data is subtracted from 359.9° in the logic gates 208–215 and as given by the step 298 of FIG. 7.

At the removal of the inhibit pulse from the converter 36, the counters 108, 110, 120 and 126 are loaded in response to the previously generated command with data from the converter 36. This is illustrated by step 300, and after completion, the sequence of operation advances at the next occurrence of a clock pulse from the gate 142 as given by curve 302. Upon each occurrence of a clock pulse from the gate 142, the integrator increments one count adding to the angular reference heading data in each counter one angular increment, such as 0.1°, as discussed previously.

As given by step 304 of FIG. 7, the counters 108, 110, 120 and 126 continue to advance and the value of the digital outputs thereof is applied to the comparators 196, 198, 200 and 202. In the sequence of operation, inquiry 306 is continuously made to evaluate if the count in the main counter equals 359.9° less the angular magnetic variation.

When the counters 108, 110, 120 and 126 advance to generate a "yes" from the inquiry 306, the sequence advances to step 310 and the end of delay (EOD) pulse is generated at the output of the gate 226 as given by the curve 312 of FIG. 6A. At this time, the identifying counter 64 is set to count one, the auxiliary counter 74 is set to count zero and the missing pulse counter 84 is set to count one. A pulse is also sent to the priority gating logic 58 and the sequence 314 generates the main reference pulse signal to be transmitted from the central antenna array 10.

Assume that the magnetic variation is clockwise of true north, the counters continue to be incremented and the sequence considers inquiry 316 by means of the logic including gates 132–136. When the counters 108, 110, 120 and 126 advance to 359.9° the inquiry 316 yields a positive response and the sequence advances to step 318 to generate a signal on line 110 to clear the counters to zero at the next clock pulse.

The identifying count pulses from the gate 252 occur every 740.7 microseconds as illustrated by the pulse signals 320 of FIG. 6B for enabling a transmission from the central antanna array. At the occurrence of an end of delay pulse from the gate 226, as given by the pulse signals 322 of FIG. 6B and FIG. 6C, the gate 250 generates an output pulse as given by the curve 324 of FIG. 6C to set the flip-flop 254 as given by the curve 326. This sets the identifying counters 246 and 248 and the output of the gate 252 drops to count one thereby inhibiting the generation of an identifying pulse signal. Upon the next occurrence of a clock pulse, the gate 172 and the flip-flop 254 are returned to logic one and the counters 246 and 248 are stepped in response to additional clock pulses from the flip-flop 246. After an additional thirty-nine clock pulses from the flip-flop 246, the counter 258 steps to logic one as given by the curve 328 and the gate 252 provides an identifying pulse as given by the curve 320 of FIGS. 6B and 6C.

Referring to FIG. 7, the sequence of generating the identifying pulse signal commences by presetting the counters 246 and 248 in step 310, the sequence next advances to step 330 indicating that the counters are being incremented. An inquiry 332 makes a comparison with the number of clock pulses from the counter 246 and when this decision is positive, the sequence advances to step 334 for generating the identifying pulse signal to be transmitted from the central antenna array 10.

An instruction from the step 334 also advances the sequence to step 336 for generating auxiliary reference pulse signals.

Referring to FIG. 6D, at the occurrence of the end of delay (EOD) pulse at the gate 226, curve 312, the gate 260 generates a pulse 338 to step the flip-flop 256 to logic zero as given by the curve 340. Upon the occurrence of an identifying pulse signal from the gate 252, the flip-flop 256 returns to a logic zero and the counter 258 is reset to one. After nine identifying pulses from the gate 252, the gate 260 again generates a pulse to set the flip-flop 256. This sequence is given in FIG. 7 by the inquiry 342 and a positive result of this inquiry steps the sequence to instruction 343 to recycle the sequence to the step 336. This recycling is implemented by resetting the counter 258 to zero.

To generate a pulse from the gate 260, the output of the counter 258 changes to logic one as given by the curve 344 which also generates a logic pulse from the gate 262. Th output of the gate 262 is the trigger for enabling a transmitter to generate the auxiliary reference pulse signals for orienting the high frequency cardioid to an interrogating aircraft. These pulses occur at the leading edge of the curve 344 and is illustrated by curve 346 of FIG. 6D. A positive response to the inquiry 342 generates the trigger for the auxiliary reference pulse signals for transmission from the central antenna array 10.

Also set by the instruction 310 is the pulse detector counter as identified by the step 348. The pulse detector counter marks the number of auxiliary reference pulse signals generated at the gate 262. When the count reaches nine, as determined by the inquiry 350, a positive response is generated to advance the sequence to step 352 for resetting the pulse detection counter 92 to one and recycling to step 348. A substitute main reference pulse signal is now generated by the output of the gate 230 in response to the positive inquiry 350.

A positive result from inquiry 350 also advances the sequence to step 354 which receives an instruction from the inquiry 306. The step 354 determines if two consecutive substitute main reference pulse signals have been transmitted from the antenna 10. If two such substitute reference pulse signals have been generated, an instruction on line 358 inhibits further operation of the system by inhibiting the counters 246 and 248 of the identifying pulse signal generator.

While only one embodiment of the invention, together with modifications thereof, has been described in detail herein and shown in the accompanying drawings, it will be evident that various further modifications are possible without departing from the scope of the invention.

What is claimed is:

1. A reference pulse signal generator in a navigation system, comprising in combination:
   means for incrementing with respect to time a heading reference signal starting at a time determined by the angular difference between a true north reference and the heading reference,
   means for generating a signal varying with the magnetic north variation from the true north reference, a coincidence detector receiving the incremented heading reference signal and the magnetic north variation signal for generating an output when the incremented signal level coincides with the variation signal, and
   trigger means responsive to the output of the coincidence detector for generating a reference pulse signal.

2. A reference pulse signal generator as set forth in claim 1 wherein said means for generating includes means for setting the magnetic variation from the true north reference.

3. A reference pulse signal generator as set forth in claim 2 wherein said means for generating further includes means for subtracting the magnetic variation from a reference and having an output signal varying with the magnetic north variation from the true north reference.

4. A reference pulse signal generator as set forth in claim 1 including counter means for generating a trigger signal for system identifying pulses, and means for inhibiting the system identifying trigger whenever a reference pulse signal is generated.

5. A reference pulse signal generator as set forth in claim 1 including counter means for generating a trigger signal for auxiliary reference pulse signals, and means for inhibiting the auxiliary reference trigger signals whenever a reference pulse signal is generated.

6. A reference pulse signal generator as set forth in claim 1 including missing pulse means for generating a trigger for a substitute reference pulse signal at selected time intervals, and means for inhibiting said pulse means by the generation of a reference pulse at said trigger means.

7. A reference pulse signal generator as set forth in claim 6 including means for counting the number of substitute reference pulse signals generated by said missing pulse means, and means for disenabling the system when said counter indexes to a preset count.

8. A reference pulse signal generator as set forth in claim 1 including means for resetting said means for incrementing each time the incremented heading reference signal coincides with the true north reference.

9. An electronic reference pulse signal generator in a navigation system, comprising in combination:
   counter means responsive to a heading reference signal and receiving incrementing timing pulses at a time determined by the angular difference between a true north reference and the heading reference, means for generating a signal varying with the magnetic north variation from the true north reference, a coincidence detector receiving the incremented heading reference signal and the magnetic north variation signal and generating an output when the incremented signal level coincides with the variation signal, and
   trigger means responsive to the output of the coincidence detector for generating a reference pulse signal.

10. An electronic reference pulse signal generator as set forth in claim 9 wherein said counter includes digital logic responsive to a digital heading reference signal.

11. An electronic reference pulse signal generator as set forth in claim 10 including a digital converter generating the digital heading reference signal in response to an analog input of the heading reference.

12. An electronic reference pulse signal generator as set forth in claim 10 wherein said counter means includes control logic responsive to an index trigger pulse representing the heading reference and receiving clock pulses for incrementing said counter.

13. An electronic reference pulse signal generator as set forth in claim 9 including means for resetting said counter means each time the heading reference signal coincides with the true north reference.

14. In a TACAN navigation system including a rotating antenna having an index trigger pulse generator, comprising in combination:
   counter means responsive to a heading reference signal and receiving incrementing timing pulses in response to an index trigger pulse from the rotating antenna,
   means for generating a signal varying with the magnetic north variation from the true north reference, a coincidence detector receiving the incremented heading reference signal and the magnetic north variation signal, and generating an output when the reference signal level coincides with the variation signal, and trigger means responsive to the output of the coincidence detector for generating a main reference pulse signal for transmission from said rotating antenna.

15. In a TACAN navigation system as set forth in claim 14 including control logic responsive to the rotating antenna index trigger pulse and connected to a source of incrementing timing pulses to be applied to said counter means.

16. In a TACAN navigation system as set forth in claim 15 wherein said means for generating includes means for setting the magnetic variation from the true north reference.

17. In a TACAN navigation system as set forth in claim 16 wherein said means for generating further includes means for subtracting the magnetic variation from a reference to produce a signal varying with the magnetic north variation from the true north reference.

18. In a TACAN navigation system as set forth in claim 17 including counter means for generating system identifying pulse signals to be transmitted from said rotating antenna, and means for inhibiting the transmission of the identifying pulse signals whenever a reference pulse signal is generated by said trigger means.

19. In a TACAN navigation system as set forth in claim 18 including counter means for generating auxiliary reference pulse signals to be transmitted from said rotating antenna, and means for inhibiting the transmission of the auxiliary reference pulse signals whenever a reference pulse signal is generated by said trigger means.

20. In a TACAN navigation system as set forth in claim 19 including missing pulse means for generating a substitute reference pulse signal at selected time intervals for transmission from the rotating antenna, and means for inhibiting the transmission of the substitute reference pulse signal from said missing pulse means.

21. In a TACAN navigation system as set forth in claim 20 including means for counting the number of substitute reference index pulse signals generated by said missing pulse means, and means for disenabling the system when said counter indexes to a preset count.

22. In a TACAN navigation system as set forth in claim 21 including means for resetting said counter means each time the incremented heading reference signal coincides with a true north reference.

* * * * *